United States Patent [19]
Maeda et al.

[11] Patent Number: 5,426,275
[45] Date of Patent: Jun. 20, 1995

[54] SEESAW SWITCH

[75] Inventors: Takuya Maeda, Furukawa; Ken Mizuta, Miyagi, both of Japan

[73] Assignee: Alps Electric Co., Ltd., Tokyo, Japan

[21] Appl. No.: 336,711

[22] Filed: Nov. 8, 1994

Related U.S. Application Data

[63] Continuation of Ser. No. 100,880, Aug. 2, 1993, abandoned.

[30] Foreign Application Priority Data

Aug. 4, 1992 [JP] Japan .................. 4-054707 U

[51] Int. Cl.⁶ ............................................ H01H 21/00
[52] U.S. Cl. .................................. 200/553; 200/5 R; 200/339
[58] Field of Search ................ 200/5 R, 5 B, 50 C, 200/517, 521, 553, 339, 337, 1 B, 332, 335

[56] References Cited

U.S. PATENT DOCUMENTS

| | | | |
|---|---|---|---|
| 2,813,160 | 11/1957 | Tong | 200/1 B |
| 3,493,707 | 2/1970 | Castle | 200/335 |
| 4,289,943 | 9/1981 | Sado . | |
| 4,434,340 | 2/1984 | Kondo | 200/332 |
| 4,654,488 | 3/1987 | Westfall | 200/553 X |
| 4,866,221 | 9/1989 | Obermann et al. | 200/5 R |
| 4,883,932 | 11/1989 | Van Hout et al. | 200/337 X |
| 4,918,264 | 4/1990 | Yamamoto et al. | 200/517 X |
| 4,929,804 | 5/1990 | Kawai et al. | 200/553 X |
| 4,975,547 | 12/1990 | Nakayama et al. | 200/517 X |

FOREIGN PATENT DOCUMENTS

| | | | |
|---|---|---|---|
| 268692 | 6/1988 | European Pat. Off. | 200/339 |
| 58-131537 | 9/1983 | Japan . | |
| 59-88838 | 6/1984 | Japan . | |
| 2-988 | 1/1990 | Japan . | |
| 2-31974 | 8/1990 | Japan . | |

*Primary Examiner*—Henry J. Recla
*Assistant Examiner*—David J. Walczak
*Attorney, Agent, or Firm*—Guy W. Shoup; Patrick T. Bever

[57] ABSTRACT

A seesaw switch including a rigid member bridging first and second elastic click members, each elastic click member carrying a moveable contact positioned over a fixed contact. A lever is pivotably positioned over the rigid member and includes a first projection contacting the rigid member near the first elastic click member, and a second projection contacting the rigid member near the second elastic click member. When the lever is pivoted a first angular amount in a clockwise direction, the first projection presses against the rigid member, causing the rigid member to rotate with respect to the second elastic member to buckle the first elastic click member. Further pivoting of the lever in the clockwise direction causes the rigid member to rotate with respect to the buckled first elastic click member, thereby buckling the second elastic click member. Similarly, when the lever is pivoted a first amount in the counterclockwise direction, the second elastic click member is buckled, and further pivoting of the lever subsequently causes the first elastic click member to buckle.

4 Claims, 5 Drawing Sheets

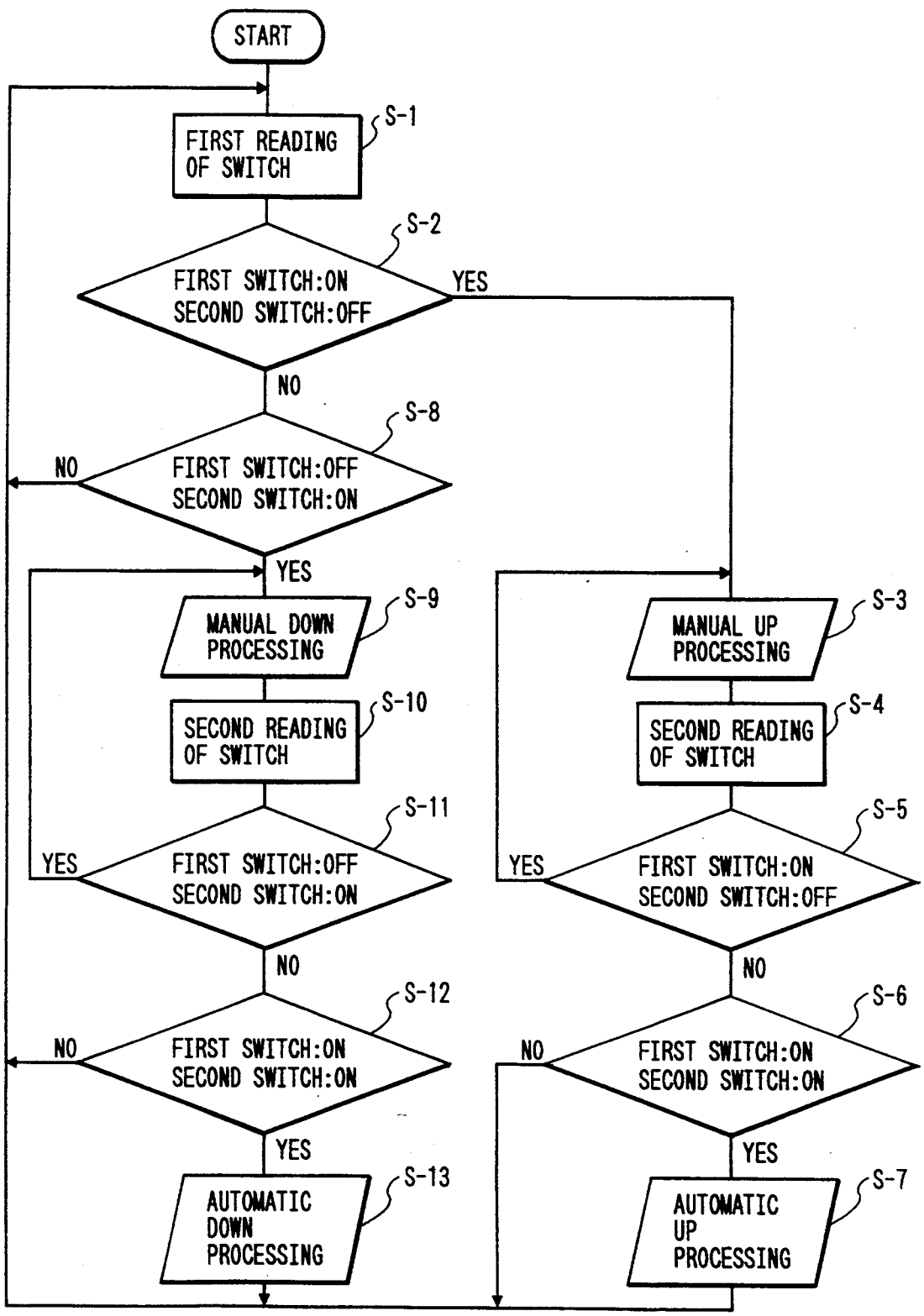

SEESAW SWITCH

This application is a continuation of application Ser. No. 08/100,880, filed Aug. 2, 1993 now abandoned.

BACKGROUND OF THE INVENTION

1. Field of the Invention

The present invention relates to a seesaw switch performing the switching operation by tilting an operating lever around a supporting shaft in both directions with respect to the supporting shaft, and more specifically to a seesaw switch with double action capable of performing double switching operations along with click feelings by tilting an operating lever in one direction.

2. Description of the Related Art

FIG. 6 is a sectional view showing a prior art seesaw switch with double action of this type, which has been disclosed in Unexamined Japanese Utility Model Publication No. SHO 60-35442. In this figure, reference numeral 1 indicates an operating lever, which is supported so as to be rockable in both the directions of the arrows A and B around a supporting shaft 2. Four pressing portions 1a, 1b, 1c and 1d are hangingly provided on the back surface of the operating lever 1, wherein the two pressing portions 1a and 1b are provided on the right side of the supporting shaft 2 and the two pressing portions 1c and 1d are provided on the left side. Reference numeral 3 indicates a click rubber composed of a silicon rubber or the like, which is mounted on a printed circuit board 4. The click rubber 3 is provided with four projecting portions 5, 6, 7 and 8 corresponding to the pressing portions 1a to 1d, respectively. Movable contact points 5a, 6a, 7a and 8a are provided on the lower surfaces of the projecting portions 5, 6, 7 and 8, respectively. On the vertexes of the two projecting portions 5 and 7 located on the inner side, cylindrical portions 5b and 7b are respectively formed in such a manner as to be respectively elastically contacted with the lower surfaces of the pressing portions 1a and 1c. On the contrary, the two projecting portions 6 and 8 located on the outer side are respectively opposed to the lower surfaces of the pressing portions 1b and 1d with specified intervals. Further, fixed contact points 1a, 1b, 1c and 1d are provided on the surface of the printed circuit board 4 so as to correspond to the movable contacts 5a, 6a, 7a and 8a, respectively. The movable contact point 5a and the fixed contact point 4a form a first switch $S_1$; the movable contact point 6a and the fixed contact point 4b form a second switch $S_2$; the movable contact point 7a and the fixed contact point 4c form a third switch $S_3$; and the movable contact point 8a and the fixed contact point 4d form a fourth switch $S_4$.

In the seesaw switch thus constructed, the operating lever 1 is usually applied with an elastic force from both the cylindrical portions 5b and 7b of the click rubber 3 to be held at the neutral position shown in FIG. 6. In this case, the first to fourth switches $S_1$, $S_2$, $S_3$ and $S_4$ are all in the off-state. When the operating lever 1 is tilted in the direction of the arrow A from the neutral position shown in FIG. 6, first, the pressing portion 1a near the supporting shaft 1 presses the cylindrical portion 5b of the projecting portion 1a.

Consequently, the projecting portion 5 is buckled, to generate a first click feeling (stepping feeling), and also the movable contact point 5a is contacted with the fixed contact point 4a to make only the first switch $S_1$ in the on-state. When the operating lever 1 is further tilted in the direction of the arrow A, the pressing portion 1b apart from the supporting shaft 1 presses the projecting portion 6, while the pressing portion 1a crushes the cylindrical portion 5b of the pressing portion 5.

Consequently, the projecting portion 6 is buckled, to generate a second click feeling, and also the movable contact point 6a is contacted with the fixed contact point 4b to make the second switch $S_2$ in the on-state, that is, to make both the first switch $S_1$ and the second switch $S_2$ in the on-state.

On the contrary, when the operating lever 1 is tilted in the direction of the arrow B from the neutral state shown in FIG. 6, first, the pressing portion 1c near the supporting shaft 2 presses the cylindrical portion 7b of the projecting portion 7, to generate a first click feeling, and also the movable contact point 7a is contacted with the fixed contact point 4c to make only the third switch $S_3$ in the on-state. When the operating lever 1 is further tilted in the direction of the arrow B, the pressing portion 1d apart from the supporting shaft 2 presses the projecting portion 8, to generate a second click feeling, and also the movable contact point 8a is contacted with the fixed contact point 4d, to make both the switch $S_4$ and the third switch $S_3$ in the on-state.

In the prior art seesaw switch described above, by tilting the operating lever 1 in one direction, the two switches are made in the on-state with the click feelings in an interlocking manner. Accordingly, in the case of using such a seesaw switch as an input switch of a power window device mounted on a vehicle, a manual action and an automatic action can be performed by the first and second switchings, respectively. For example, assuming that the direction of the arrow A is taken as an UP side and the direction of the arrow B is taken as a DOWN side, by tilting the operating lever 1 in the direction of the arrow A, it is possible to perform a manual UP during the first switch $S_1$ is in the on-state, and to perform an automatic UP when the second switch $S_2$ following on the switch $S_1$ is turned on. On the contrary, by tilting the operating lever 1 in the direction of the arrow B, it is possible to perform a manual DOWN during the third switch $S_3$ is in the on-state, and to perform an Automatic DOWN when the fourth switch $S_4$ following on the third switch $S_3$ is turned on.

However, for realizing such a double action, the two switches for one side, that is, the four switches $S_1$ to $S_4$ in total, which are operated by the tilting of the operating lever 1, are required. This brings about such disadvantages that the seesaw switch is enlarged in size, and the circuit additionally formed on each of the switches $S_1$ to $S_4$ is complicated, resulting in the increased cost.

SUMMARY OF THE INVENTION

In view of the above situation, the present invention has been made, and an object of the present invention is to provide a seesaw switch with double action suitable for miniaturization with a low cost.

To achieve the above object, according to the present invention, there is provided a seesaw switch comprising: an operating lever rockably supported around a supporting shaft; and a first and second click projecting portions provided at opposed positions with respect to the supporting shaft, which are buckled by tilting of the operating lever; whereby the on-off operation of the first and second switches are performed by the buckling of the first and second click projecting portions. In the above seesaw switch, an action bar bridging the first and second click projecting portions is interposed between the operating lever and the first and second click projecting portions.

The function of the present invention will be described below.

When the operating lever is tilted in one direction, the action bar is rotated around the second click projecting portion side in the same direction as in the operating lever. Consequently, the first click projecting portion is pressed on the action bar, so that the first switch is turned on along with a first click feeling. When the operating lever is further tilted in the same direction, the action bar cannot press the first click pressing portion beyond that; accordingly, the action bar is rotated around the first click projecting portion in the direction reversed to that of the operating lever. Accordingly, the second click projecting portion is pressed by the action bar, so that the second switch is turned on along with a second click feeling.

When the operating lever is tilted in other direction, the operation quite reversed to the above is performed: namely, first, the second switch is turned on along with a first click feeling, and further, the first switch is turned on along with a second click feeling by further tilting the operating lever.

Accordingly, for example, only the first and second switches can realize four kinds of processings: a manual UP taken as the case that only the first switch is turned; a manual DOWN taken as the case that only the second switch is turned on; an automatic UP taken as the case that the second switch is turned on after the first switch is turned on; and an automatic DOWN taken as the case that the first switch is turned on after the second switch is turned on.

BRIEF DESCRIPTION OF THE DRAWINGS

FIG. 5 is a flow chart showing an operational procedure of FIG. 4; and

DETAILED DESCRIPTION OF THE PREFERRED EMBODIMENTS

Hereinafter, embodiments of the present invention will be described with reference to the accompanying drawings.

Figure 1:
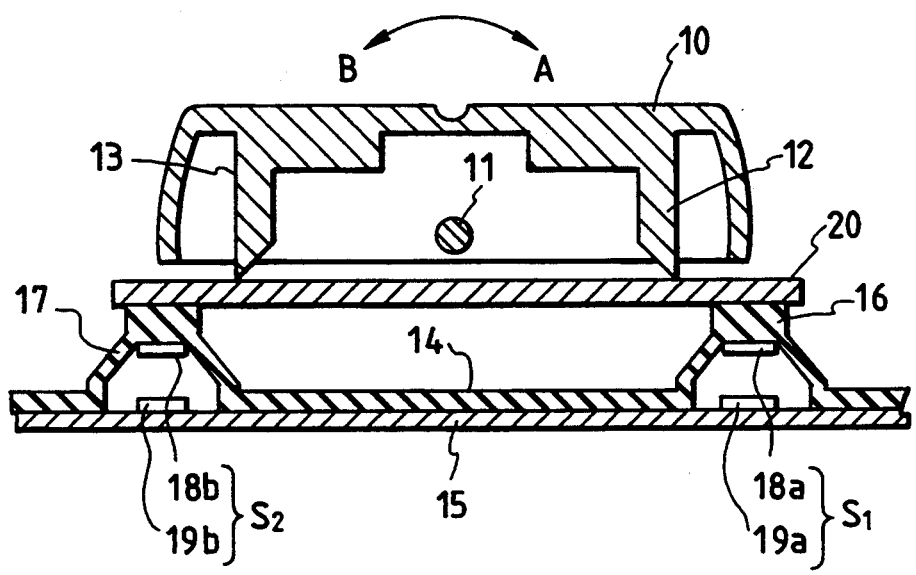
FIG. 1 is a sectional view showing a neutral state of a seesaw switch according to an embodiment of the present invention.

FIG. 1 is a sectional view of a seesaw switch according to one embodiment of the present invention; FIG. 2 is a view for explaining the action of the seesaw switch of FIG. 1 which is tilted in one direction; FIG. 3 is a view for explaining the action of the seesaw switch of FIG. 1 which is tilted in the other direction; FIG. 4 is a circuit block diagram of a power window device; and FIG. 5 is a flow chart showing the action procedure of a CPU of FIG. 4.

In FIGS. 1 to 3, reference numeral 10 indicates an operating lever, which is supported in such a manner as to be rockable around a supporting shaft 11 in the directions of the arrows A and B. A first pressing projection 12 and a second pressing projection 13 are hangingly provided on the back surface of the operating lever 10. These pressing projections 12 and 13 are symmetric with respect to the supporting shaft 11. Reference numeral 14 indicates a click rubber, which is mounted on a printed circuit board 15. A first projecting portion 16 and a second projecting portion 17 are provided on the click rubber 14. Movable contact points 18a and 18b are respectively formed on the lower surfaces of the projecting portions 16 and 17. On the other hand, a pair of fixed contact points 19a and 19b are formed on the surface of the printed circuit board 15. The movable contact point 18a and the fixed contact point 19a form a first switch $S_1$, and the movable contact point 18b and the fixed contact point 19b form a second switch $S_2$. Reference numeral 20 indicates an action bar, which is formed of a high rigidity material such as synthetic resin or metal. The action bar 20 is mounted to be bridged across the projecting portions 16 and 17. The pressing projections 12 and 13 are abutted on the upper surface of the action bar 20.

In the seesaw switch thus constructed, the operating lever 10 is usually applied with an elastic force from both the projecting portions 16 and 17 of the click rubber 14 to be held in such a neutral position as shown in FIG. 1. In this case, both the first switch $S_1$ and second switch $S_2$ are in the off-state.

Figure 2A:
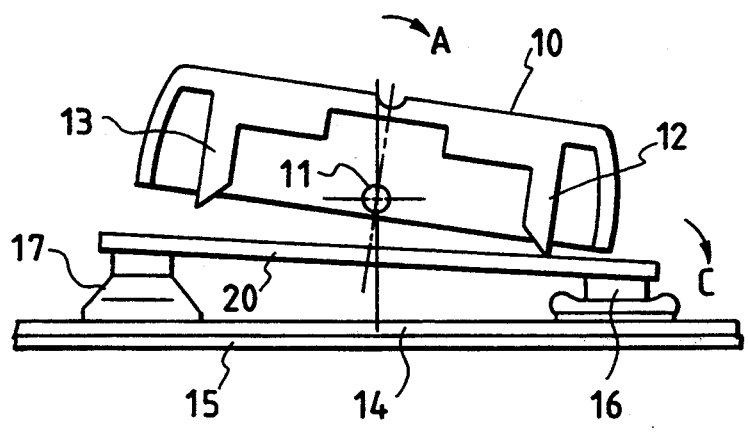
FIGS. 2(a) and 2(b) are section side views for explaining the action of the seesaw switch in FIG. 1 on one directional side.
Figure 2B:
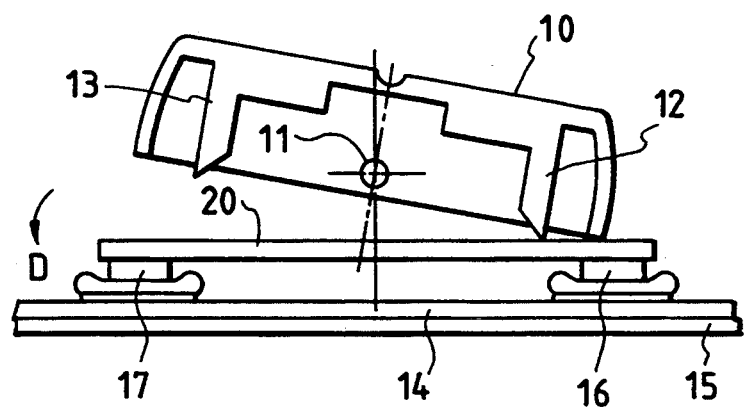

When the operating lever 10 is tilted in the direction of the arrow A from the neutral state shown in FIG. 1, the rotational force is transmitted from the first pressing projection 12 to the action bar 20. As a result, as shown in FIG. 2(a), the action bar 20 is rotated around the second projecting portion 17 in the direction of the arrow C, to press the first projecting portion 16. Thus, the first projecting portion 16 is buckled to generate a first click feeling, and also the movable contact point 18a is contacted with the fixed contact point 19a to make the first switch $S_1$ in the on-state. When the operating lever 10 is further tilted in the direction of the arrow A, the action bar 20 cannot press the first pressing portion 16 beyond that: accordingly, as shown in FIG. 2(b), the action bar 20 is rotated around the first projecting portion 16 in the direction of the arrow D, to press the second projecting portion 17. Thus, the second projecting portion 17 is buckled to generate a second click feeling, and also the movable contact point 18b is contacted with the fixed contact point 19b to also make the second switch $S_2$ in the on-state. Namely, when the operating lever 10 is tilted in the direction of the arrow A, the first switch $S_1$ is made in the on-state along with the first click feeling, after which the second switch $S_2$ is made in the on-state along with the second feeling.

Figure 3A:
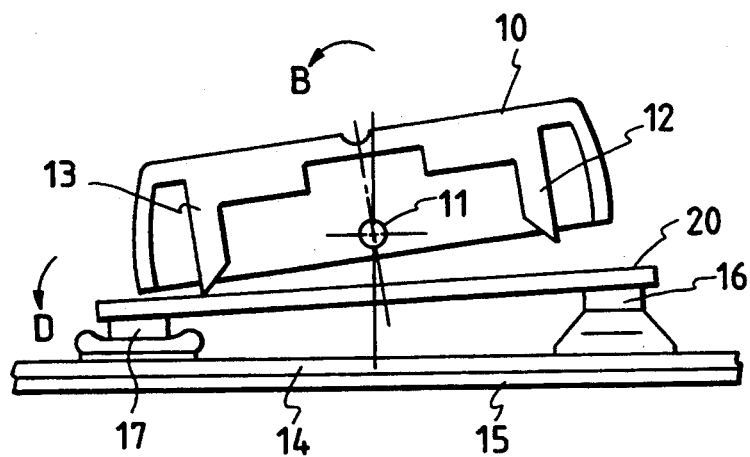
FIGS. 3(a) and 3(b) are section side views for explaining the action of the seesaw switch in FIG. 1 on the other directional side.
Figure 3B:
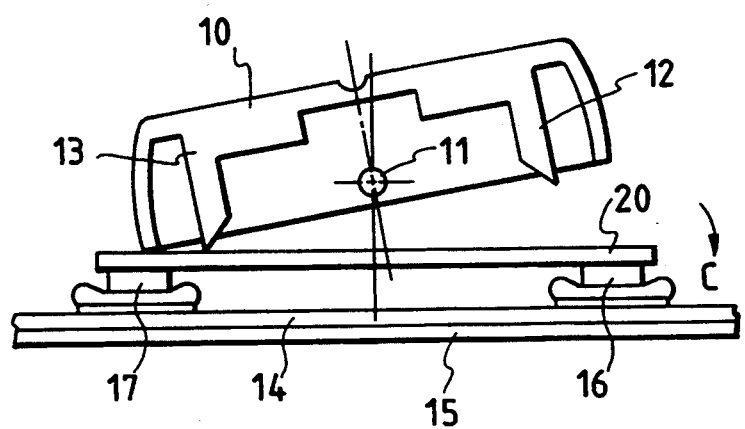
Figure 4:
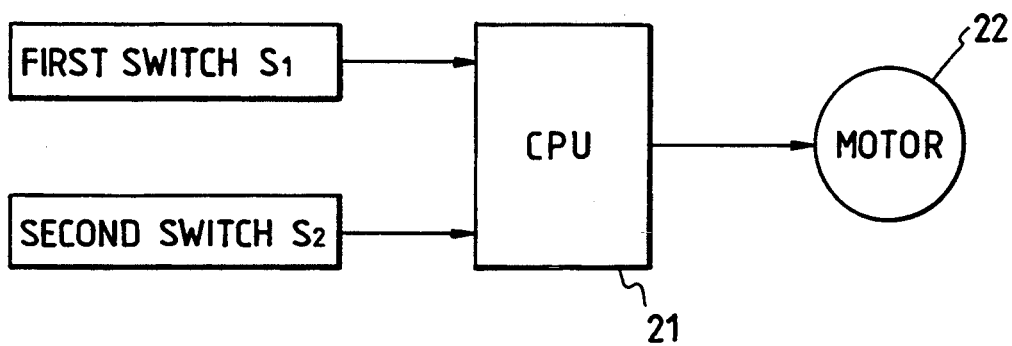
FIG. 4 is a circuit block diagram of a power window device mounted on a vehicle to which the seesaw switch in FIG. 1 is applied.
Figure 6:
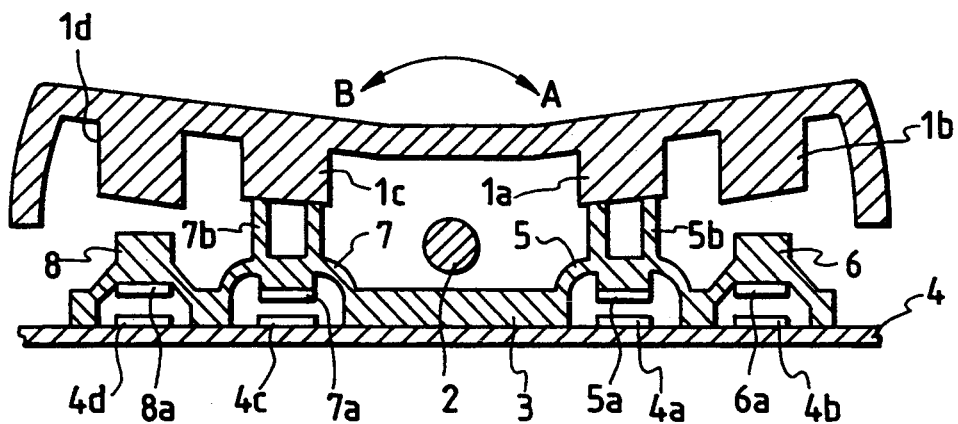
FIG. 6 is a sectional view of a seesaw switch with double action according to a prior art.

On the contrary, when the operating lever 10 is tilted in the direction of the arrow B from the neutral state shown in FIG. 1, first, as shown in FIG. 3(a), the action bar 20 is rotated around the first projecting portion 16 in the direction of the arrow D, to press the second projecting portion 17 Thus, the second projecting portion 17 is buckled to generate a first click feeling, and also the movable contact point 18b is contacted with the fixed contact point 19b to make the second switch $S_2$ in the on-state. When the operating lever 10 is further tilted in the direction of the arrow B, the action bar 20 cannot press the second projecting portion 17 beyond that; accordingly, as shown in FIG. 3(b), the action bar 20 is rotated around the projecting portion 17 in the direction of the arrow C, to press the first projecting portion 16. Thus, the first projecting portion 16 is buckled to generate a second click feeling, and also the movable contact point 18a is contacted with the fixed contact point 19a to also make the first switch $S_1$ in the on-state. Namely, when the operating lever 10 is tilted in the direction of the arrow B, the second switch $S_2$ is made in the on-state along with the first click feeling, after which the first switch $S_1$ is made in the on-state along with the second click feeling.

The action of the seesaw switch according to the above embodiment which is applied to an input switch of a power window mounted on a vehicle will be described below. In this case, as shown in FIG. 4, signals outputted from the first and second switches $S_1$ and $S_2$ are read by a CPU 21. On the basis of the signals, the CPU 21 performs the following operations, to transmit four kinds of control signals to a motor 22. The motor 22 rotates in either normal or reverse direction on the basis of the control signals. For example, in the case of the normal rotation, there are performed a manual UP action by which a window is ascended during the switch is in the on-state, and an automatic UP action by which the window is automatically ascended when the switch is once turned on. On the other hand, in the case of the reverse rotation, there are performed a manual DOWN action by which the window is descended during the switch is in the on-state, and an automatic DOWN action by which the window is automatically descended when the switch is once turned on.

Namely, as shown in FIG. 5, the above CPU 21 performs the first reading of switch in a step S-1, to determine the on-off state of the first and second switches. Here, if the first switch $S_1$ is in the on-state and the second switch $S_2$ is in the off-state, that is, in such a state as shown in FIG. 2(a), the process goes on from a step S-2 to a step S-3, wherein the above manual UP processing is performed. Subsequently, the second reading of switch is performed in a step S-4. Thus, if the switch $S_1$ is in the on-state and the second switch $S_2$ is in the off-state as before in a step S-5, the process is returned to the step S-3, wherein the manual UP processing is performed again. If NO in the step S-5, the process goes on to a step S-6. Thus, if both the first and second switches $S_1$ and $S_2$ are in the on-state in the step S-6, that is, in such a state as shown in FIG. 2(b), the process goes on to a step S-7, wherein the above automatic UP processing is performed. In addition, if the first and second switches $S_1$ and $S_2$ are in the off-state, that is, in the case that both the switches $S_1$ and $S_2$ are returned from the state of FIG. 2(a) to the neutral position of FIG. 1, the process is returned to the step S-1.

On the other hand, if the first switch $S_1$ is not in the on-state in the step S-2, the process goes on to a step S-8, wherein it is determined whether or not the first switch $S_1$ is in the on-state and the second switch $S_2$ is in the on-state. If NO in the step 8, that is, in the case that both the switches $S_1$ and $S_2$ are in the off-state and is thus in the state of FIG. 1, the process is returned to the step S-1. If YES in the step S-8, that is, in the state of FIG. 3(a), the process goes on to a step S-9, wherein the above manual DOWN processing is performed. Subsequently, the second reading of switch is performed in a step S-10. Thus, if the first switch $S_1$ is in the off-state and the second switch $S_2$ is in the on-state as before in a step S-11, the process is returned to the step S-9, wherein the manual DOWN processing is performed again. If NO in the step S-11, the process goes on to a step S-12. Thus, if both the first and second switches $S_1$ and $S_2$ are in the on-state in the step 12, that is, in the state of FIG. 3(b), the above automatic DOWN processing is performed. In addition, if both the first and second switches $S_1$ and $S_2$ are in the off-state in the step S-12, that is, in the case that both the switches $S_1$ and $S_2$ are returned from the state of FIG. 3(a) to the neutral position of FIG. 1, the process is returned to the step S-1.

Thus, in the above embodiment, by tilting the operating lever 10 in one direction, it is possible to operate both the first and second switches $S_1$ and $S_2$ along with the click feelings. Further, since the order of turning on the first and second switches $S_1$ and $S_2$ is changed depending on the tilting direction of the operating lever 10, it is possible to output four kinds of signals by the combination of one operating lever 10 and two switches $S_1$ and $S_2$. Accordingly, as compared with the prior art using four switches according to four kinds of signals, it is possible to reduce the number of the switches in half. As a result, it is possible to reduce the whole size of the seesaw switch, and to simplify the circuit additionally provided on each switch resulting in the lowered cost.

In addition, in the above embodiment, the movable contact points 18a, 18b and the fixed contact points 19a, 19b forming the first and second switches $S_1$ and $S_2$ are provided on the click rubber 14 and the printed circuit board 15, respectively.

However, in place of each contact, there may be used a switch called as a membrane switch provided on a film, which is so constructed as to be pressed and driven by the projecting portions 16 and 17.

Further, in the above embodiment, the click rubber 14 composed of a rubber material is used as a click member. However, there may be used a click member composed of an elastic metal plate formed in a circular arm shape.

As described above, according to the present invention, by tilting the operating lever in one direction, the first and second switches are turned on along with the click feeling. Further, the order of turning on both the switches is changed depending on the tilting direction of the operating lever. Therefore, it is possible to provide a seesaw switch with double action suitable for miniaturization with a low cost.

What is claimed is:

1. A seesaw switch comprising:
    first and second elastic members;
    a rigid member bridging the first and second elastic members, the rigid member having a first portion contacting the first elastic member and a second portion contacting the second elastic member, the rigid member having a central portion which is centrally located between the first and second portions; and
    a lever pivotally mounted adjacent to the rigid member, the lever including a projection contacting the rigid member between the first portion and the central portion;
    wherein when the lever is pivoted a first angular amount from a neutral position in a first direction, the rigid member is pivoted with respect to the second elastic member, thereby buckling the first elastic member, wherein when the lever is pivoted a second angular amount from the neutral position in the first direction, the rigid member is pivoted with respect to the buckled first elastic member, thereby buckling the second elastic member;

wherein the lever further includes a second projection contacting the rigid member between the second portion and the central portion;

wherein when the lever is pivoted a third angular amount from a neutral position in a second direction, the rigid member is pivoted with respect to the first elastic member, thereby buckling the second elastic member, and wherein when the lever is pivoted a fourth angular amount from the neutral position in the second direction, the rigid member is pivoted with respect to the buckled second elastic member, thereby buckling the first elastic member.

2. A seesaw switch according to claim 1, wherein the lever includes a supporting shaft, and the first and second projections are symmetrically positioned with respect to the supporting shaft.

3. A seesaw switch according to claim 1 further comprising:

first and second fixed contacts located adjacent the first and second elastic members, respectively;

a first contact connected to the first elastic member; and a second contact connected to the second elastic member;

wherein the first fixed contact and first movable contact are arranged such that when the first elastic member is buckled, the first movable contact is pressed against the first fixed contact; and wherein the second fixed contact and second movable contact are arranged such that when the second elastic member is buckled, the second movable contact is pressed against the second fixed contact.

4. A seesaw switch according to claim 1 further comprising first and second membrane switches located adjacent the first and second elastic members, respectively;

wherein the first membrane switch is arranged such that when the first elastic member is buckled, the first membrane switch is actuated; and wherein the second membrane switch is arranged such that when the second elastic member is buckled, the second membrane switch is actuated.

* * * * *